Oct. 7, 1952   J. H. STARR   2,613,237
CALCULATING TABLES AND THE LIKE
Filed Aug. 27, 1947   5 Sheets-Sheet 2

*INVENTOR.*
BY  James H. Starr,
*Atty.*

Oct. 7, 1952           J. H. STARR           2,613,237
CALCULATING TABLES AND THE LIKE

Filed Aug. 27, 1947           5 Sheets-Sheet 4

INVENTOR.
James H. Starr,
BY
Thos. A. _____
ATTY.

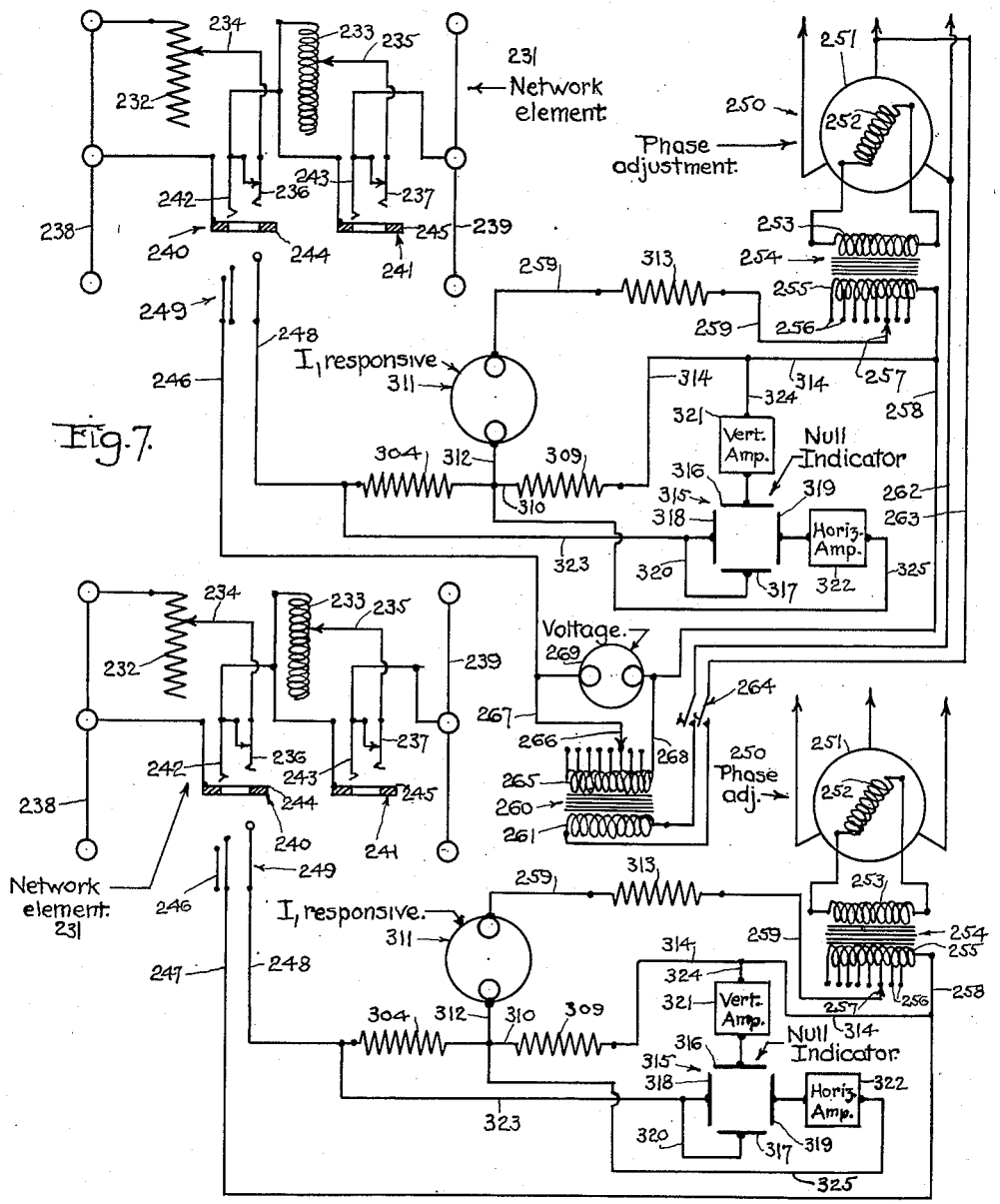

UNITED STATES PATENT OFFICE 2,613,237

CALCULATING TABLES AND THE LIKE

James H. Starr, La Grange, Ill.

Application August 27, 1947, Serial No. 770,850

8 Claims. (Cl. 171—95)

This invention relates to improvements in calculating tables, and the like. The invention concerns itself primarily with improvements in the arrangements and instrument connections and circuits whereby greatly increased accuracy of readings may be ensured throughout the entire range of readings which may be expected, and without the need of increasing the accuracy of the instruments themselves over the accuracies and ranges of readings which are currently being provided in such instruments. In order that the features of my present invention may be better understood I shall first explain certain characteristics of current responsive instruments and like devices, and I shall then show and disclose the improvements to which this invention is directed.

In my issued patent of the United States, No. 2,301,470 issued November 10, 1942, for Improvements in Calculating Tables and the Like, I have described and claimed improvements which are broadly applicable to all calculating boards, whether operating from direct current or from alternating current sources. Generally stated the method and structure disclosed and claimed in that earlier patent, and distinguishing over all prior art disclosures is the use of a current responsive instrument carrying a scale calibrated in impedance units as the basis for the adjustment of each of the several impedance simulating elements of the calculating board. In the commercial form of this calculating board the impedance scale is calibrated from 2.00 per unit impedance to 0.10 per unit, and circuit changes are accomplished by switching to permit reading impedance down to 0.00 per unit. The same instrument is used in reading current in each branch of the calculating board, and for this purpose the instrument carries a second scale calibrated in per unit current from 0.00 to 10.00 per unit. This scale is readable down to 0.20 per unit at the lowest marked scale division.

It is standard commercial practice of instrument manufacturers to guarantee the accuracy of electrical instruments by stating the error at any point will not exceed a stated percentage of full scale. Although there are sound reasons for such a method of stating instrument error, it will be appreciated that it results in a probable error which, when expressed in percent of actual magnitude, increases as the magnitude decreases. As an example, in the commercial form of the calculating board, the calibrated full scale of the per unit I (current) scale is 10.0 per unit, and a 1% instrument is employed. At 10.0 per unit current the reading will lie between 9.9 and 10.1 per unit; but if the current measured is actually 1.0 per unit, the reading will lie between 0.9 and 1.1 per unit. This is a possible error of 10%. However, if the current is 0.1 per unit, the reading will lie between 0.0 and 0.2 per unit. This is an error of 0.1 per unit, amounting to an error of plus or minus 100% and obviously excessive.

In the actual use of the calculating board for the solution of problems arising in small electric systems, the current in any significant branch may be expected to be of the order of possibly 10% of the total system current. If the operator by the exercise of judgment and experience, selects a current base such that the total system load is of the order of 10.0 per unit, the possible error in reading any individual branch current will be of the order of 10%, which may be acceptable in many cases. In the solution of problems involving many branches and in which the current in a significant branch may be as little as 1% of the total system load, the error from this cause may easily be excessive.

It has been found that when expanding the type of calculating board disclosed in that earlier patent to meet the conditions existing in networks of large power distribution systems, there are so many circuits transmitting current that the current in any one branch may be quite small compared with the total. If a single instrument scale is provided, the current in some or many branches may be too small to produce an accurately readable deflection; or, alternatively, the total current must be increased substantially beyond the full scale calibration of the instrument. The second alternative requires that the capacity of the battery or other power source be increased together with the current carrying capacity of switches, rheostats, and other components in which the total system current may flow.

At this point it may be noted that an instrument may be provided with two or more scales, the additional scales providing for adequate deflection and improved accuracy when measuring current in the smaller branches of the system network. It is, however, a fact that when the current required to produce full scale deflection of an instrument is reduced, the necessary torque to obtain the desired deflection must be obtained by increasing the number of active turns in the instrument coil or by other means. The other means known in the art are limited and any substantial reduction in current necessary for full scale deflection is, substantially, equivalent to a requirement that the resistance of the instrument be increased if it be a direct current instrument, or the impedance be increased if the instrument be an alternating current instrument. Such an increase in either resistance or impedance cannot be tolerated in a device of the class described, for the reasons explained below.

In a calculating board constructed as disclosed in the issued Patent No. 2,301,470, the instrument serves two essential purposes. It is connected in circuit with the potential source and an impedance element to permit the adjustment of the impedance element selected to some selected setting within its range as indicated by the per unit Z scale of the instrument. It is also inserted into the various branches of the completed network to permit measurement of the current therein by using the per unit I scale. As a quantitative example, the rheostats employed as impedance elements in a typical direct current operated calculating board are adjustable over a range of substantially zero to 15,000 ohms. The resistance of the instrument selected is limited to 1.5 ohms maximum, and cannot be reduced substantially below this value except by undesirably increasing the current required for full scale deflection. When a 1.5 ohm instrument is connected in circuit with a 15,000 ohm resistance the change of the resistance of the circuit is only $\frac{1}{100}$ percent of that of the rheostat. But as the setting of the rheostat is reduced the percentage error due to the resistance of the instrument becomes greater. If an error of 1% be established as the maximum acceptable, the rheostat cannot be set below 150 ohms. If a more sensitive instrument be employed, as for example, one requiring $\frac{1}{10}$ the current for full scale deflection, the resistance of the movement of such instrument would be increased from 10 to 20 times the 1.5 ohm value. If limited to 15 ohms, the rheostat can be set only to values between 1,500 and 15,000 ohms if the error limitation is to be held at 1%. The usable range of the rheostat is thus reduced to 10/1 instead of 100/1 and serious inconvenience in operation would result.

It has therefore been found that when using the instrument circuit disclosed in my earlier patent, it is necessary to compromise between errors resulting from relatively high instrument resistance (or impedance, in the case of alternating current operated instruments), providing acceptably large deflections; and errors resulting from undesirably small instrument deflection obtained with an acceptably low instrument resistance (or impedance). This condition has been recognized and circuit constants have been chosen to obtain the optimum in accuracy and convenience with due regard to cost. The result has been entirely satisfactory for the majority of network studies but cases do occur, particularly in connection with power systems of large extent, in which it is important that errors due to the above mentioned factors be reduced below the minimum attainable by the best possible selection of circuit constants within commercially practicable limits.

It is evident that the errors above described would be entirely eliminated if it were possible to provide an instrument having multiple scales to cover a wide current range, and having zero resistance (or impedance). I have secured the foregoing result by reducing the "equivalent" resistance (or impedance) of the instrument to zero, and I have provided means to secure this result in a calculating board whether direct or alternating current operated. Furthermore, I have provided means to secure this result in such calculating boards with further provision for changing the ratio at which the instrument will measure, so that it may be caused to read according to various selected ratios, and with provision for reducing the "equivalent" resistance (or impedance) to zero in the case of each such selected ratio. For example, it may be caused to indicate a current equal to that flowing in the branch in which it is inserted, or to indicate 10 times that current, or 100 times that current; as the operator may select. Errors resulting from resistance (or impedance) of the instrument as well as errors resulting from very small deflection of the instrument pointer, are thus eliminated.

In brief outline my present improvements may be stated as follows:

I provide in a local circuit including the indicating instrument, a local current source, together with local resistances or impedances of known value, to impose an additional amount of current flow through the indicating instrument, such increase being of known amount or proportion as compared to the value of the current flowing through the network element under test. I provide means for the adjustment of the circuit constants of this local circuit to select one of several available ratios between the current flowing through the indicating instrument and that flowing through the network element under test. I provide a scale or scales, on the indicating instrument suitably calibrated to indicate correctly the current flowing in the network element under test at each position of the pointer as deflected by the augmented current flowing in the indicating instrument. I further provide means to indicate to the operator a condition of balance between the two voltage drops one of which is due only to the current flowing in the network element, and the other of which is due to only the locally generated additional current, and I further provide means to adjust the locally generated additional current to obtain the desired condition of balance. When the desired condition of balance is obtained and indicated by the null indicator which is provided, the voltage drop due to the current flowing in the network element under test is equal to and opposite to that due to the locally generated current and the net total voltage drop is zero. This condition is equivalent to the insertion of zero resistance (or impedance) in circuit with the network element under test.

My invention may be further stated to include a method and means by which the error inherent in commercial current responsive instruments at small scale readings, or at small fractions of full scale deflection may be minimized or avoided without introducing additional resistance or impedance into the circuit the current in which circuit is being measured. I have herein disclosed several alternative forms of the means whereby this and other objects are attained. It is here noted that the improvements constituting the present invention are applicable to calculating boards already constructed and in service, and which include the features of my earlier patent, No. 2,301,470, as well as to calculating boards embodying the features of that earlier patent but which calculating boards have not yet been built. It is further here noted that the improvements of the present invention may be used in or in connection with calculating boards using either direct or alternating current, and designed for simulating either direct current or alternating current networks. Accordingly I shall hereinafter disclose in detail the circuits and means of the present invention improvements in three general categories, as follows:

1. A structure comprising an accessory intended for use with existing direct current operated calculating boards incorporating the general features of my earlier patent, No. 2,301,470.

2. A structure or circuit modification capable of incorporation or inclusion in new calculating boards to be built embodying the features of my earlier patent, No. 2,301,470, so as to directly combine in such new calculating boards the features of the present invention as well as said features of said earlier patent.

3. A structure or circuit modification capable of incorporation or inclusion in new calculating boards or as an accessory to already existing calculating boards, which calculating boards include the features of my said earlier patent, No. 2,301,470, and which calculating boards are for alternating current operation.

It is here noted that all three of the foregoing categories to be hereinafter described and illustrated include the features of the present invention, and are generically of the same category. At this point it may be mentioned that in my earlier patent there are shown the jack openings 27 and 70 (there is provided one of the jack openings 27 for each of the network impedances to be simulated), and a cord 29 is shown in that patent having its ends provided with the plugs which are intended for insertion, one end into the opening 70 and the other end into that opening 27 corresponding to the network element to be tested. In order to adapt the improvements of the present invention to such already constructed calculating boards I have, as category "1" above listed, provided an accessory including two cords connected into such accessory and having their free ends provided with plugs suitable for insertion into the openings 27 (as selected) and 70, respectively. Upon so inserting these accessory plugs this accessory becomes a portion of the calculating board as an entirety, and thereupon the current responsive instrument 43 of the calculating board as shown in that earlier patent may be used to read the current in the selected element of the network; this accessory being itself provided with an instrument to indicate the "null" condition under which said instrument 43 should be read. When incorporating the features of the present invention into newly built calculating boards all switches, rheostats, and "null" indicators required for the practice of the presently disclosed improvements will generally be built directly into such newly built calculating boards as integral portions thereof.

When using the features of the present invention in or with calculating boards intended for direct current operation it is evident that no phase difference exists between current and supplied voltage. Consequently it is unnecessary when using direct current sources to make any special provision for ensuring proper phase position of various voltage drops when reading test instruments. When using alternating current sources however, it is true that the voltage drops may differ in phase as well as in magnitude. It is therefore necessary, when using alternating current sources to provide structures capable of a null or balancing adjustment both as to phase and magnitude. Therefore when using alternating current the source should be fixed in frequency, and ideally should be of pure sine wave shape; and this alternating current source should be adjustable in phase and in magnitude. Likewise the "null" indicator hereinbefore referred to, which in the case of a direct current source may conveniently be in the form of a galvanometer, in the case of an alternating current source must be capable of detecting and indicating to the operator any condition of unbalance whether due to a difference in phase or a difference in magnitude, or both. Furthermore, certain precautions are necessary when using an alternating current source to ensure that no phase shift errors are introduced by the structure of the improvements herein disclosed, themselves. It is also necessary that the operator be able to determine not only the magnitude of currents and voltages, but the phase position of these quantities as well. Such provision I have made in the present invention, as will presently appear in full detail.

Other objects and uses of the invention will appear from a detailed description of the same which consists in the features of construction and combinations of parts hereinafter described and claimed.

In the drawings:

Figure 1 shows a typical wiring diagram of a circuit element including the features of the present invention, and in which said circuit element comprises an accessory unit intended for use in connection with a direct current supplied calculating board of the general form shown in Letters Patent of the United States, No. 2,301,470; and Figure 1 also shows portions of the circuits illustrated in that earlier patent, so as to better show the relationship between the circuits shown in that earlier patent and the improvements of the present invention;

Figure 6:
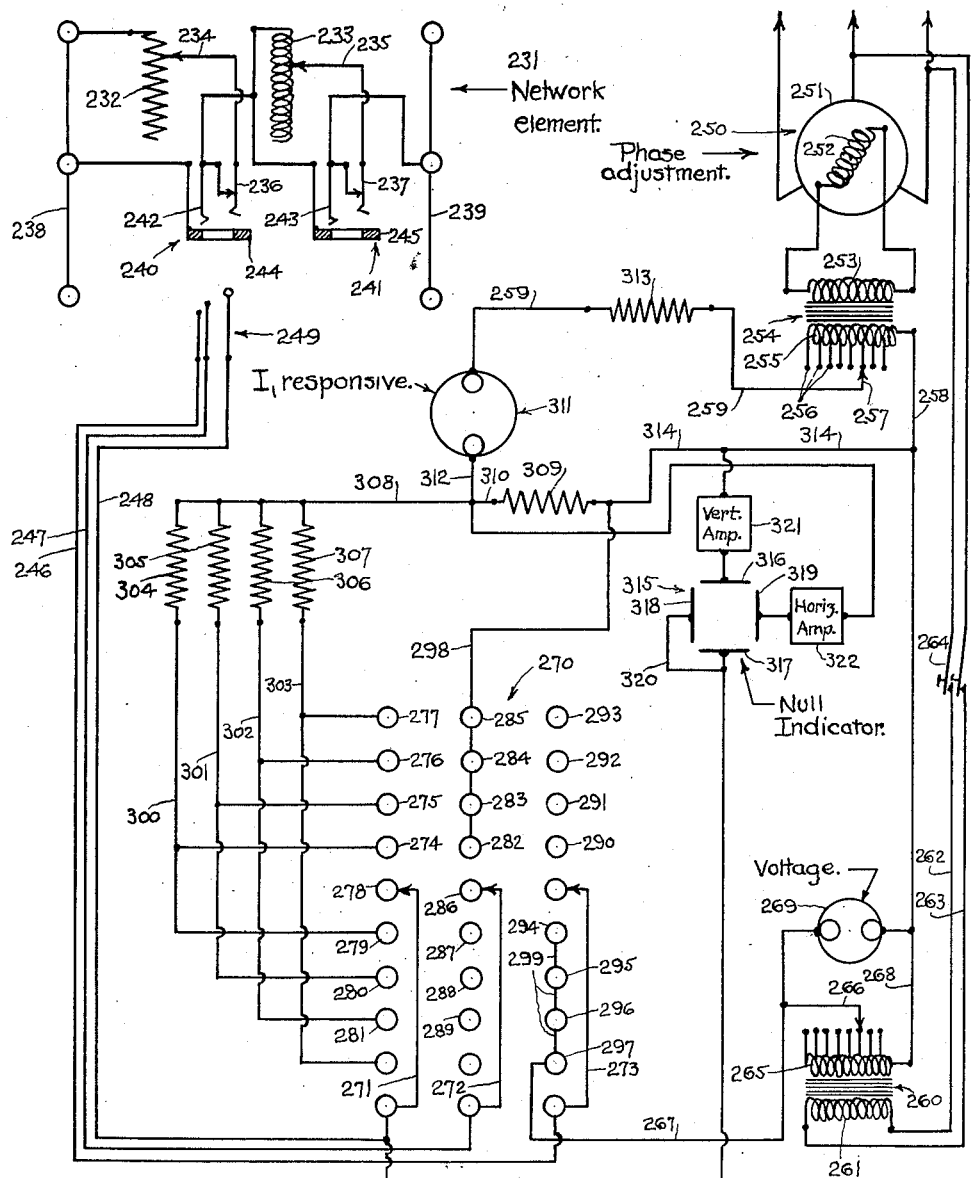

Figure 6 shows more or less schematically a portion of the circuits of an alternating current calculating board embodying the features of my earlier patent, No. 2,301,470, together with the features of the present invention and intended for operation on an alternating current source; the alternating current source shown in this figure including a polyphase field producing a rotating field acting on a blocked single phase wound armature to produce in the windings of such armature a single phase alternating current, and the phase position of this current may be readily adjusted by merely turning said armature to a different angular position within the field element;

Figure 7 shows a simplified wiring diagram similar to that shown in Figure 6 having provision for adjusting an impedance to any desired value; and Figure 8 shows a wiring diagram similar to that of Figure 7 with provision for reading current in such impedance element when it forms a part of a complete network.

Figure 9:
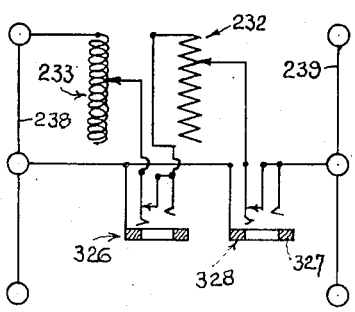

Fig. 9 shows a portion of the wiring diagram of Fig. 6, wherein provision is made for compensating for the inherent resistance of the inductor.

I shall first describe in detail a typical circuit embodying the features of the present invention as applied in the case of an accessory unit which may be used with the circuit arrangement shown in patent, No. 2,301,470. For this purpose reference may be had to Figure 1 showing a typical accessory unit in its relation to certain elements of the calculating board shown in said earlier patent; and to Figures 2, 3, and 4 which show in fragmentary form a portion of the circuits of the accessory unit of Figure 1, but with the selector switch moved to its three different positions, as shown in said Figures 2, 3 and 4, respectively.

Figure 1:
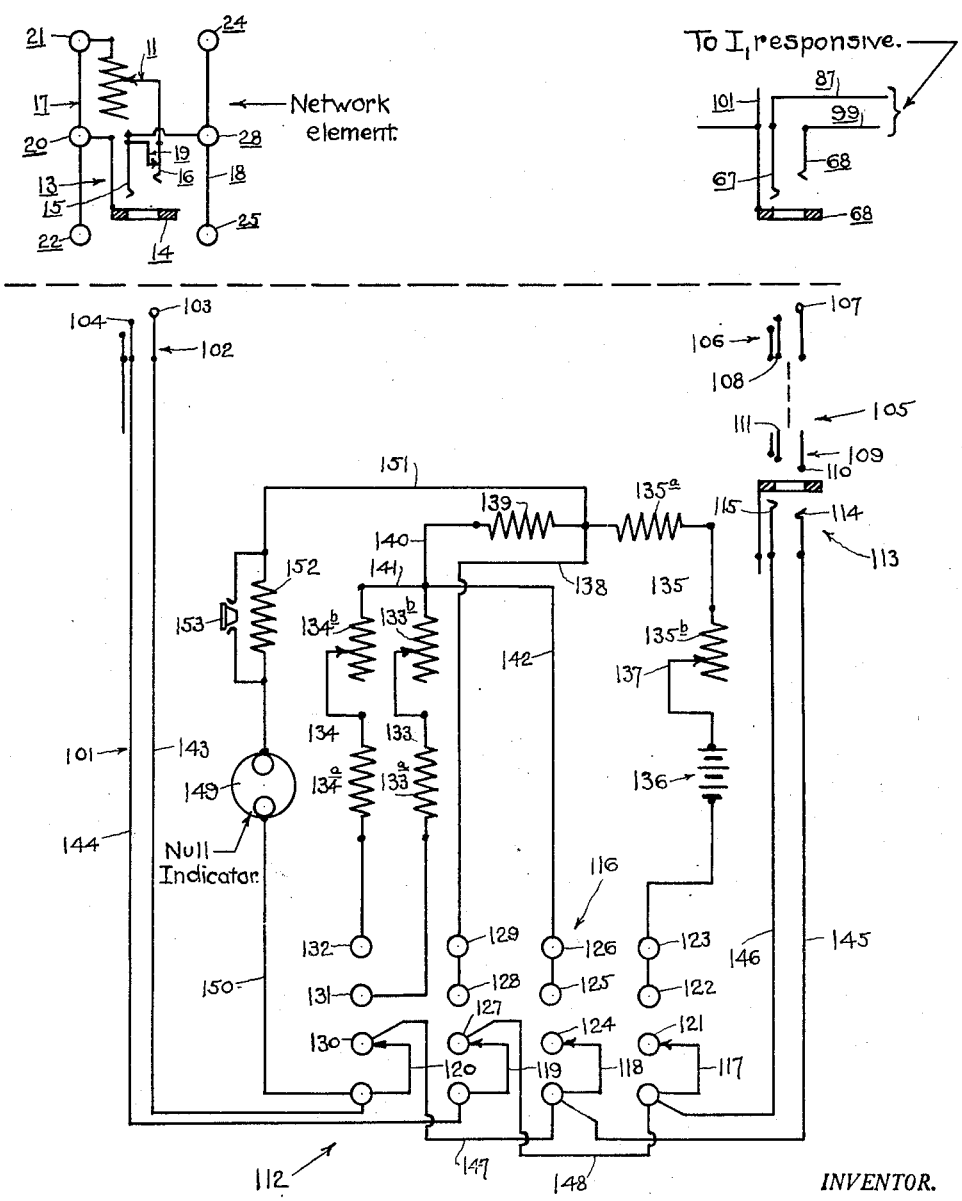

In Figure 1 I have shown one of the jacks 13 of Patent 2,301,470 and the corresponding variable resistance with its movable contact 11; and I have also shown the spring contact 16 for engagement by the tip of an inserted plug, and the spring contact 15 for engagement by the ring contact of the inserted plug, and also the sleeve contact 14 for engagement by the sleeve of the inserted plug. In this figure I have also shown the jack contact 68, the ring contact 67, and the sleeve contact 66 corresponding to like numbered parts of said earlier patent. I have also shown the cord 101 having the plug 102 which has the tip contact 103 adapted to engage the contact 16, and also having the contact 104 adapted to engage the ring contact 15, when the plug is inserted into the jack in the well understood manner. Thus the variable resistance of the calculating board is brought into a circuit presently to be described through the medium of the cord 101. I have also in Figure 1 shown a cord 105 having at one end the plug 106 which has the tip contact 107 and the ring contact 108 adapted respectively to engage the contacts 68 and 67 of the calculating board circuit as illustrated in said earlier patent. Thus, with the switch 71 of that earlier patent moved to its position "Branch I," the current responsive instrument 43 of that patent is brought into a circuit including the cord 105. The other end of this cord 105 is provided with a plug 109 having the tip contact 110 in connection with the tip contact 107, and the ring contact 111 in connection with the ring contact 108.

I have, in this accessory embodiment of the present invention, provided a suitable box-like unit 112 which includes various elements to be presently explained. The cord 101 enters this unit 112. This unit 112 also includes a jack 113 having the tip contact 114 and the ring contact 115 which are adapted to be engaged by the contacts 110 and 111 of the cord plug 109 already referred to. Thus, when said cord plug is inserted into this jack the cord conductors are continued to the jack contacts 114 and 115, respectively. Thereby, also the current responsive instrument 43 of my earlier patent disclosure is connected into this unit 112.

This unit 112 also includes a three position, four contact switch 116. This switch has the four contacts 117, 118, 119 and 120 which may be simultaneously moved into either one of three positions, corresponding to ratios 1/1, 10/1, and 100/1, respectively. For this purpose this switch has the three stationary contacts 121, 122 and 123, for the movable contact 117; it has the three stationary contacts 124, 125 and 126, for the movable contact 118; it has the three stationary contacts 127, 128 and 129, for the movable contact 119; and it has the three stationary contacts 130, 131 and 132 for the movable contact 120.

An impedance element 133 (which may be a simple resistance or other impedance element) is provided for the ratio of 10/1; and another impedance element 134 (which may also be a simple resistance or other impedance element) is provided for the ratio 100/1. Preferably each of these elements 133 and 134 comprises two sections or elements one of which is fixed in value, and the other of which is of variable value so that the combined impedance of each of these elements 133 and 134 may be preset or factory adjusted to an exact value in the final adjustment of the unit at the factory. These sections are shown at 133$^a$ and 133$^b$, and at 134$^a$ and 134$^b$, respectively. Having been factory adjusted these impedance elements will thereafter correctly ensure the desired ratios, for example, 10/1, and 100/1, as previously mentioned.

The unit 112 also includes a resistance element or impedance element 135 of variable amount and under control of the operator. This element 135 conveniently comprises the two sections 135$^a$ and 135$^b$, in which case the section 135$^a$ may be made of fixed value, and the section 135$^b$ may be of variable or adjustable value, under control of the operator.

The unit 112 also includes a battery or other source of current 136. One terminal of this battery or other current source connects to the switch contacts 122 and 123, and the other terminal of this battery or other current source connects to the movable contact 137 of the variable resistance or impedance element 135$^b$. The free end of the resistance or impedance element 135 (specifically, the free end of the section 135$^a$) connects by a lead 138 with the contacts 128 and 129 of the switch 116. Thus, whenever said switch is moved to either of its positions for ratio 10/1 or ratio 100/1 this resistance or impedance element 135 is brought into the circuits to be established, and said resistance or impedance element 135 and the battery or source of current 136 are together connected in series to the switch movable contacts 117 and 119. Also, under these conditions the value of the resistance or impedance 135 may be controlled or varied by the operator to secure the "null" reading of the galvanometer or other indicating instrument presently to be described.

Another resistance or impedance element 139 is provided in this unit. One end of this resistance element is connected to the lead 138 (and therefore also to the adjacent end of the element 135$^a$); and the other end of this element 139 is connected to a lead 140 which in turn connects to the lead 141 which is connected to the free ends of both of the elements 133$^b$ and 134$^b$. The leads 140 and 141 are also connected by a lead 142 to the stationary contacts 125 and 126 of the switch 116. Accordingly the following circuit connections are established; whenever the switch contacts are moved to either the 10/1 or the 100/1 ratio position all of the resistance or impedance elements or sections 133$^b$, 134$^b$, and 139 are connected to both of the switch stationary contacts 125 and 126.

The free ends of the resistance or impedance sections 133a and 134a are connected respectively to the stationary contacts 131 and 132 of the switch 116. Therefore, either the resistance or impedance element 133 or 134 will be connected to the movable contact 120 of such switch, depending on the position to which the switch is thrown; and the other of said resistance or impedance elements 133 or 134 will be left in open circuit condition. Thus by moving the movable contacts of the switch 116 into position to engage the stationary contacts 122, 125, 128, and 131 circuits will be established which include the resistance or impedance element 133 but not the element 134; whereas by moving the movable contacts of the switch 116 into position to engage the stationary contacts 123, 126, 129, and 132 circuits will be established which include the resistance or impedance element 134 but not the element 133. Thus the switch 116 may be brought into position to make either the ratio element 133 or the ratio element 134 effective.

The tip 103 of the plug 102 connects by a lead 143 to the movable contact 120 of the switch 116; and the ring contact 104 of said plug 102 connects by a lead 144 to the movable contact 119 of said switch 116. Likewise the tip contact 114 of the jack 113 connects by a lead 145 to the movable contact 118 of the switch 116; and the ring contact 115 of the jack 113 connects by a lead 146 to the movable contact 117 of the switch 116. The lead 145 also connects by a lead 147 to the contact 130 of the switch 116; and the lead 146 also connects by a lead 148 to the contact 127 of said switch 116.

This unit 112 also is provided with a galvanometer or other "null" indicator 149 of relatively sensitive character so that very small differences of potential impressed across the terminals of this null indicator will cause said indicator to indicate such condition. One terminal of this null indicator is connected by a lead 150 to the lead 143 and also to the movable contact 120 of the switch 116. The other terminal of this null indicator connects by a lead 151 to the lead 138 and therefore to both of the resistance or impedance elements 135 and 139; and to ensure protection to this null indicator against excessive potential impositions, and also to ensure final and most sensitive indications by said null indicator, the following provisions have been made; a resistance element 152 is placed in said lead 151 between the terminal of the null indicator and the said resistance or impedance elements 135 and 139; and a short-circuiting button 153 is connected across this resistance 152 so that by pushing this button to its closed contact position the resistance is cut out, and final adjustments may be made with the null indicator operating under its most sensitive conditions.

The operation of this accessory unit arrangement will be understood from the following statement of functions:

Assuming that the movable contacts of the switch 116 are in their first operating position, the contact 120 engages the contact 130, the contact 119 engages the contact 127, the contact 118 engages the contact 124, and the contact 117 engages the contact 121. Under these conditions the resistance or impedance element of the network under test is connected directly to the current responsive instrument by the following circuits; lead 143, movable contact 120, lead 147, and lead 145, cord 105, plug tip contact 107 to tip spring 68 of jack 70 of the original calculating board. From this point the circuit to the instrument is completed through position "Branch I" of the switch 71 of the original calculating board, returning through ring contact 67 of jack 70, cord 105, lead 146, lead 148, movable contact 119, and lead 144 back to the resistance or impedance element under test. It is here to be noted that with the switch 116 in the position just described, although the galvanometer or other null indicator is connected to the lead 144 by the lead 150 no further connection is established, since none of the switch contacts 122, 123, 125, 126, 128, 129, 131 or 132 is engaged by a movable contact of said switch. Under these conditions the current responsive instrument 43 will be caused to indicate current flowing in the resistance or impedance under test (or inversely, the resistance or impedance of said element) by a ratio of 1/1 or unity. This is the condition which is equivalent in all respects to the normal conditions of operation of a calculating board such as disclosed in my said patent, No. 2,301,470, when no such accessory as here described is available or connected into the circuit.

Figure 2:
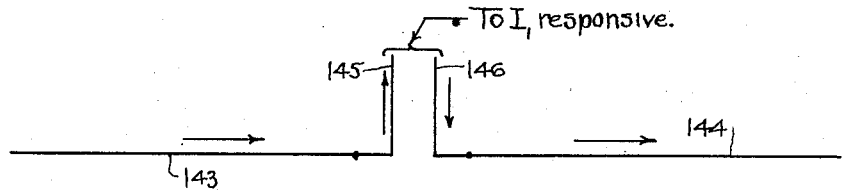
Figure 2 shows in fragmentary form a portion of the circuits of the improvements shown in Figure 1, with the selector switch in its position to establish a ratio of 1/1 for the current responsive instrument.

In Figure 2 I have shown schematically the foregoing connections which exist for this first or unity ratio condition.

Next, by moving the switch contacts 120, 119, 118, and 117 to the next or second operating position, the contact 120 engages the contact 131, the contact 119 engages the contact 128, the contact 118 engages the contact 125, and the contact 117 engages the contact 122. With these connections established we find the following circuits to be effective; the current flowing through the resistance or impedance element under test flows through the element 133 in full volume to the point of junction of the leads 140 and 142 (which latter connects to the lead 145 through the movable contact 118). There is also established, with this switch position, a further and local circuit which includes the resistance or impedance element 139, and the resistance or impedance element 135 with the battery 136. The lead 145 leads to one terminal of the current responsive instrument, and the other terminal of this instrument connects by the lead 146 to this local circuit. The battery is so connected that its effect is to cause a flow of current through the resistance or impedance elements 135 and 139 in direction opposite to the flow of current from the network element under test (which current comes in over the lead 143 and through the resistance or impedance element 133). Consequently the total current flowing through the current responsive instrument 43 is the sum of both the current flowing through the network element under test and this locally or battery induced current, that is, the actual current flowing through the current responsive instrument is increased over the current actually flowing through the network element.

The junction point of the two resistance or impedance elements 135 and 139 is connected to the other terminal of the network element under test by the lead 144 (coming over the lead 138 and the movable switch contact 119), so that the real current flowing through the network element under test is returned in proper manner. In other words, there is superimposed on this true network element current a local additional current, and the total current thus produced additively is passed through the current responsive instrument and causes the scale deflection thereof.

With these connections established by the positioning of the movable switch contacts into this second operating position the null detector or indicator 149 is also connected between the two leads 143 and 144 of the system so that any difference of potential existing between these two leads will be at once indicated by a deflection of the needle of such null indicator. Contrarily, when said needle shows no deflection it will be known that both of the leads 143 and 144 are at the same potential, notwithstanding that the current flowing through the network element under test is being passed through the accessory unit now under consideration. In other words, there is actually no drop of potential occurring through this unit and its elements and connected parts, as far as the outside effect is or may be concerned.

Figure 3:
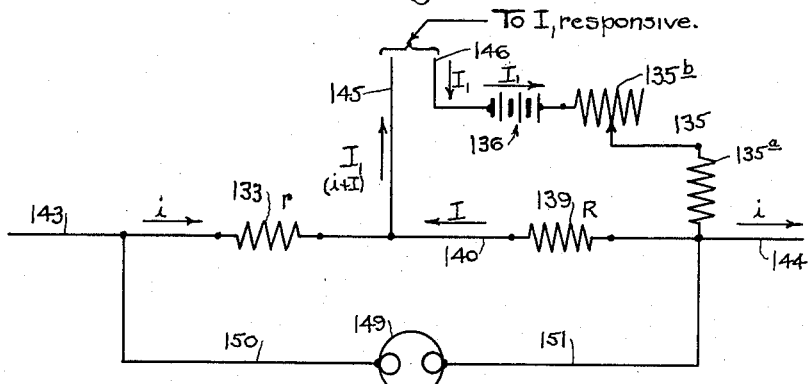
Figure 3 shows a view similar to that of Figure 2, but with the selector switch in its position to establish a 10/1 ratio for the current responsive instrument.
Figure 4:
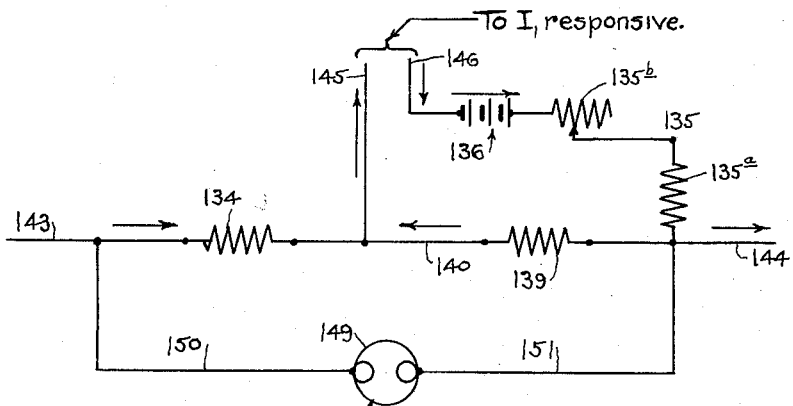
Figure 4 shows a view similar to those of Figures 2 and 3, but with the selector switch in its position to establish a 100/1 ratio for the current responsive instrument.

In Figure 3 I have shown schematically the foregoing connections which exist for this second or 10/1 ratio condition. Reference should therefore now be made to this Figure 3 for a simple illustration of the circuits thus established.

In Figure 3 the resistance or impedance element 133 for the ratio 10/1 is of fixed value (once it has been calibrated). The resistance or impedance element 139 is also of fixed value. When the network element is connected into the circuit by plugging into its jack 27 a current will flow through the resistance or impedance element 133 producing a drop of potential through this element. However, the battery 136 will produce a current flow coming to the junction point of leads 140 and 145, and there joining the current arriving from the network element under test. The total current so produced will then flow through the current responsive instrument 43, subjecting that instrument to an exaggerated current value and correspondingly causing an increased deflection of that instrument to occur, such increase depending on the value of this superimposed current. This superimposed current will also flow through the resistance or impedance element 139 causing a drop of potential to occur over such element; and due to the fact that the potential drops over the two elements 133 and 139 are of opposing sign it follows that the total potential difference between the leads 143 and 144 will be the algebraic sum of these drops across the elements 133 and 139; and the indicator 149 will thus be subjected to this algebraic sum of potential differences. Such algebraic sum may be in either direction, or may be zero, in which latter case said null indicator 149 will show no deflection; a "null" indication will be given.

When the network element is first introduced into the circuits as just explained this indicator 149 will almost always show a deflection in one direction or the other. Then, by adjusting the variable resistance or impedance element 135$^b$ the current flowing through the branch circuit may be either increased or decreased until the potential drop across the resistance or impedance element 139 becomes equal to the drop across the element 133. Since these two drops are in opposition to each other the net drop between the points of connection of the leads 143 and 144 will become zero under the conditions just above stated. The null indicator 149 will then show a zero deflection. Thereupon the current responsive instrument 43 may be read, and its reading will be under the condition that no loss of potential is occuring between the points of connection of the leads 143 and 144. This is equivalent to securing the reading of the instrument 43 under the condition that the "equivalent" resistance or impedance between the connections 143 and 144 is zero, corresponding to a zero resistance or impedance of the current responsive instrument and the connections immediately related to it.

Under this condition of a null reading of the null indicator the drops across the elements 133 and 139 are equal to each other. Since the current flowing through the instrument 43 is equal to the sum of the currents flowing through the elements 133 and 139 it follows that a definite relationship is established between the magnitude of the current arriving over the lead 143 (and departing over the lead 144), and the magnitude of the current flowing over the lead 145 to the instrument 43 and arriving from said instrument over the lead 146, under the condition of a null reading of the indicator 149. In other words, a definite ratio is established between the value of the current being measured by the instrument 43 and the true value of the current flowing through the network element under test. That ratio is determined as follows:

Let $i$ designate the current value flowing through the network element (arriving over the lead 143 and departing over the lead 144); let I designate the current value flowing through the element 139; let $r$ designate the resistance or impedance of the element 133; and let R designate the resistance or impedance of the element 139. Then, $$i \times r = I \times R$$

for the null condition. Now let $I_1$ designate the current value flowing through the instrument 43 (flowing out over the lead 145 and back over the lead 146). Then, $$I_1 = i + I$$

also, $$I = i \times r/R$$

Upon substituting we get, $$I_1 = i + i \times r/R$$

or again, $$I_1 = i(1 + r/R)$$

and finally, $$I_1/i = 1 + r/R$$

In other words, the ratio of the current flowing through the current responsive instrument 43 as compared to the current flowing through the network element under test is equal to unity plus the ratio of the impedance of the element 133 divided by the impedance of the element 139. This equation therefore provides us with a simple means to determine the relative values of these impedances 133 and 139 for any desired multiplication of the true value of the current flowing through the network element to determine the value of the current flowing through the instrument 43 for the null condition. In other words, by this equation we may determine the relative values of the impedances of the elements 133 and 139 for any desired multiplication of the value of the current flowing through the network element, which multiplied current is to be flowed through the instrument 43 so as to give an increased scale deflection in its reading.

It should here be noted that the battery or other source of current, 136, should be of sufficient voltage to ensure flow of the superimposed current in sufficient volume to make it possible to secure the null condition above referred to. Likewise the resistance or impedance element 135 must be of sufficient current carrying capacity, and of sufficient impedance range to enable not only the carrying of the needed current, but also to enable control of the volume of that current with accurate adjustments by means of the adjustable section 135$^b$, to enable bringing the circuit to the balanced condition as shown by the null reading of the instrument 149.

As a simple illustration of actual ohmic values of the elements 139, 133 and 134 the following illustration is given:

By assuming a value of 70 ohms for the element 139, and a value of 630 ohms for the element 133, we find that the ratio $I_1/i$ becomes equal to 1 plus 630/70, or 1 plus 9, or 10. Likewise, by leaving the element 139 at 70 ohms, and selecting an ohmic value of 6930 for the element 134, we find that the ratio $I_1/i$ becomes equal to 1 plus 6930/70, or 1 plus 99, or 100. Therefore by selecting the value of 70 ohms for the element 139, and the values of 630 ohms and 6930 ohms for the elements 133 and 134, respectively, it is possible to obtain ratios of 10 and 100 by moving the switch 116 to its second and third positions, respectively. Evidently, if desired a greater number of switch positions might be provided, of additional ratio values, or other combinations of ratio values and numbers of switch positions could be provided for optionally.

Conveniently when using the features of the present invention in an accessory for use with a calculating board of the type of my earlier patent, No. 2,301,470, the various elements of such accessory as shown in Figure 1 may be incorporated within a box or housing of relatively small size and weight. The top of this instrument may be of an insulating panel, the same carrying the switch element 116, null indicator 149, and a button or handle for adjustment of the resistance or impedance section 135$^b$ in order to adjust for the null reading condition. The switch 116 may be provided with a single control button whereby the several movable contacts 117, 118, 119, and 120 may be brought simultaneously to either of positions 1, 2 or 3. The panel board may then be provided with suitable markings to indicate the momentary position of such adjustable button. This panel board or box top may also be provided with the jack element 113; and the accessory end of the cord 101 may be connected into the accessory in convenient manner. Within this accessory box may be contained the several resistance or impedance elements 133$^a$, 133$^b$, 134$^a$, 134$^b$, 152, 139, 135$^a$, 135$^b$; and the battery 136 may also be contained within this box-like accessory. With this convenient arrangement of the accessory unit it becomes possible to use the present improvements in connection with previously built calculating boards embodying the features of my earlier patent, and without the need of any changes in such earlier calculating board's construction. Such an accessory unit as just described may be brought into a size of substantially 7″ long, 4½″ wide, and 4″ high for use with a calculating board having any number of network element simulating elements.

In a convenient embodiment of the accessory unit the rheostat 135$^b$ is made continuously variable between zero and at least 15,000 ohms. Preferably also this rheostat is of tapered ohmic values so that the rate of change of resistance or impedance per degree of rotation of the control button is small at small values of impedance, and is larger at larger values, to facilitate smooth and accurate adjustment.

It is noted that the resistance or impedance 135 is conveniently divided into two sections 135$^a$ and 135$^b$ for the following reasons: The local battery 136 is conveniently of about 4½ volts potential. By dividing the element 135 into two sections, 135$^a$ and 135$^b$, and by making the section 135$^a$ of, say 150 ohms impedance, there will always be an impedance of at least 220 ohms in the circuit of the instrument 43 (150 ohms in the section 135$^a$ and 70 ohms in the element 139, disregarding the impedance of the instrument 43 itself). Thus the maximum current to which the instrument 43 might be subjected would be 20 milliamperes, a safe value for such an instrument as would generally be selected for the instrument 43. Of course whenever the impedance section 135$^b$ is adjusted to any position other than zero the current flowing through the instrument 43 will be correspondingly reduced.

I have now disclosed in detail a convenient form of an accessory unit intended for use with previously built calculating boards of type embodying the features of said earlier patent, No. 2,301,470, to enable use of the improvements of the present invention with such previously built calculating boards I shall now disclose an embodiment whereby the improvements of the present invention may be incorporated into calculating boards yet to be built.

In the above described accessory unit the benefits of the present improvements are applied only in the measurement of current in the network branches. This limited application is dictated by the practical consideration that complete benefits are obtainable only by extensive revision of existing wiring of the original calculating board. In the application of the present invention to completely new calculating boards, the benefits of zero "equivalent" impedance of the current measuring instrument are made available also in the adjustment of individual impedance elements to selected settings. It will be seen that this permits full use of the entire available impedance range of these elements without introducing any error due to insertion impedance of the measuring instrument. When the features of the present invention are to be incoporated into new calculating boards the wiring may be originally designed to not only incorporate said features directly in such calculating boards without the necessity of providing an accessory unit such as already described herein. In so doing it is also possible to incorporate in such revised wiring of the new calculating boards certain additional features which I shall mention at this point.

In said earlier Patent No. 2,301,470, provision is made for variation of the resistance 46 disclosed in that patent from time to time so that compensation could be made for changes in battery voltage or other supplied potential, and likewise, in order that the voltmeter 51 shown in that patent may be so adjusted that it will correctly read the per unit voltage, there is provided the resistance 54 in that patent. The resistances 46 and 54 of that patent should be adjusted to the correct value corresponding to the battery terminal voltage then present. It is, however, to be noted that such an adjustment, while providing for change of battery voltage with age or other causes, did not make provision for change of battery voltage with change of load imposed by current demands of the network elements themselves. It is also to be noted that when such multiplications of readings of the instrument 43 as 10/1 or 100/1 are used (as are herein provided for), corresponding multiplications of errors due to slight changes of voltage are introduced, so that when using the improvements of the present invention which have already been disclosed it is also desirable to hold the voltage delivered to the network more closely to a prescribed value, for example, 18, regardless of the value of the battery voltage (or other source), and regardless of what the value of the current load on that battery may be. I have, therefore, incorporated in my present improvements when used in newly to be built calculating boards, special means to compensate for any slight changes in voltage, whether due to changes of battery loading or otherwise, during the conducting of the various tests to be conducted on the calculating board. These provisions I shall presently disclose herein.

In the circuit arrangements illustrated in said earlier patent there is provided a reversing switch whereby the polarity of the current responsive instrument may be reversed if necessary to ensure correct reading of such instrument when it is used for various tests. When the improvements of the present invention are incorporated into a newly to be built calculating board it is necessary that the currents flowing through the two resistances or impedances 133 and 139 (see Figures 1, 3 and 4) be through both of these elements towards the common connection 145 (or from said connection) in order that the desired balancing of potentials may be secured to enable a null indication to be given by the instrument 149. In order to secure this result as well as to ensure proper functioning of the current responsive instrument 43 I have included in the modified circuits of such newly to be built calculating boards a reversing switch whereby the polarity of the bus-bars 37 and 38 of the network element under test or adjustment may be reversed, thus ensuring correct operations in all circuits.

A further improvement in the circuits of such newly to be built calculating boards embodying the features of the present invention as well as the features of said earlier patent is as follows:

In that earlier patent I illustrated a five position switch 71 to enable the securing of the various switching combinations required as shown in that patent. Since in newly to be built calculating boards embodying all of the features which have been disclosed herein it is necessary to make provision for reading in three ratios (1/1, 10/1, and 100/1), the incorporation in that switch all of the functions assigned to such switch in said earlier patent, plus provision for two additional switch positions needed to enable functioning of all three of such ratios, it would be necessary to provide for seven positions in that switch. Furthermore, with such an arrangement it would be necessary to pass through the positions of 10/1 ratio and 100/1 ratio in order to reach the position of "Read Total I" (such as shown in said earlier patent). Such an arrangement would be undesirable for various reasons, including possible trouble by overloading when moving to this "Read Total I" position. Accordingly, I have, in the circuit arrangement presently to be disclosed for such newly to be built calculating boards provided a special jack for such "Total I" readings, into which special jack the plug 69 of that earlier patent may be inserted. Thereupon the switch may be moved to any one the three ratio positions to measure the total current by use of the selected ratio as determined by such switch position.

I shall now describe an arrangement of calculating board which includes the features of that earlier patent as well as the features of the present invention, when all of said features are embodied in a newly to be built calculating board. For this purpose reference is now made to Figure 5.

Figure 5:
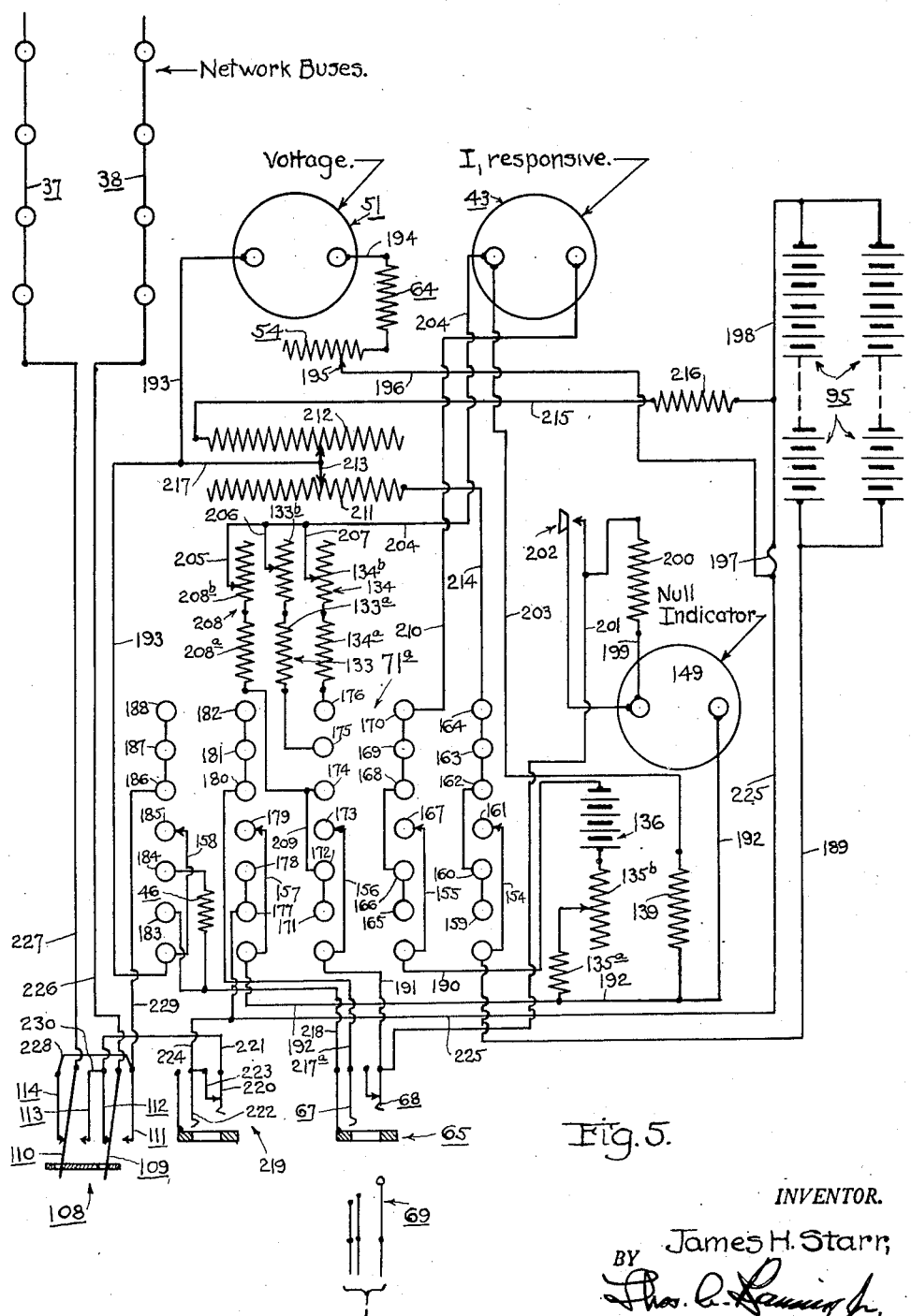
Figure 5 shows a fragmentary wiring diagram for that portion of the current responsive instrument circuits needed to embody the features of the present invention into a newly to be built calculating board so that the benefits of the present invention may be provided by such calculating board.

In Figure 5 I have shown the current responsive instrument 43, the voltmeter 51, the battery 95, the resistances 64 and 54 for the voltmeter, the jack 69, and the reversing switch 108 corresponding to like elements of said earlier patent. I have also shown the busbars 37 and 38 of one of the network elements shown in that earlier patent, and it will be understood that other network elements may be incorporated in these newly to be built calculating boards, and that the one shown in Figure 5 is merely illustrative. In Figure 5 I have also shown the switch 71 corresponding to the like numbered switch of that earlier patent, but in the present case the switch illustrated is provided with six live positions instead of five as in that patent.

The switch 71ª of Figure 5 is provided with the five movable contacts 154, 155, 156, 157 and 158 which are conveniently connected together so that they will move in unison. This switch is provided with six live positions to either of which positions the movable contacts may be adjusted. Thus, there are the stationary contacts 159, 160, 161, 162, 163 and 164 for the movable contact 154; there are the stationary contacts 165, 166, 167, 168, 169 and 170 for the movable contact 155; there are the stationary contacts 171, 172, 173, 174, 175 and 176 for the movable contact 156; there are the stationary contacts 177, 178, 179, 180, 181 and 182 for the movable contact 157; and there are the stationary contacts 183, 184, 185, 186, 187 and 188 for the movable contact 158.

The movable contact 154 is connected to the positive terminal of the battery 95 by the lead 189; the movable contact 155 is connected to the negative terminal of the battery 136 by the lead 190; the movable contact 156 is connected to the tip contact 68 by the lead 191; the movable contact 157 is connected to one terminal of the null indicator 149 by the lead 192; and the movable contact 158 is connected to one terminal of the voltmeter 51 by the lead 193.

The "multiplier" rheostat 54 is provided, together with the fixed resistance 64, both for the voltmeter 51 and corresponding to like parts of the circuit shown in said earlier patent. The resistance 64 is connected to the free terminal of the voltmeter 51 by the lead 194, the two rheostats are connected together, and the slide or adjustment contact 195 of the rheostat 54 connects to the lead 196. This lead connects through the fuse 197, and by a lead 198, to the negative terminal of the battery 95. The slide contact 195 enables adjustment of the total resistance in the voltmeter circuit between limits determined by the resistance 64 and 64 plus 54. The total resistance is factory adjusted to a value such that a preselected voltage, say 18 volts, will produce a deflection of the instrument 51 corresponding to 1.0 per unit voltage, and is sealed at this value.

One terminal of the null indicator 149 connects to the lead 192 as already stated. The other terminal of this null indicator connects by a lead 199 to a protective resistance 200, and a lead 201 extends from this protective resistance to the movable contact 156 (through the lead 191 already mentioned). A short-circuiting button 202 has its terminals connected to the lead 201 and to the terminal of the null indicator to which the resistance 200 is connected, so that by depressing this button the resistance 200 is cut out from the null indicator circuit to increase sensitivity of said null indicator for the final null adjustments, similar to the function of the button 152 of the arrangement shown in Figure 1.

The resistance element 135 (including the two sections 135a and 135b) is connected between the lead 192 and the positive terminal of the battery 136. The section 135a is adjustable in manner similar to the like section shown in Figures 1, 3 and 4. The fixed resistance or impedance element 139 is connected between the lead 192 and one terminal of the current responsive instrument 43 to which terminal this element 139 is connected by the lead 203. This lead 203 (and the corresponding terminal of the instrument 43) is connected to a lead 204. To this lead 204 there are connected the adjustment slides 205, 206 and 207 for the adjustable sections 208b, 133b, and 134b, respectively. These sections 133b and 134b correspond to the sections of like numbering shown in Figure 1; being for the 10/1 and 100/1 ratios respectively. The additional section 208b introduced into Figure 5 is for the 1/1 ratio, and will be discussed further hereinafter. Corresponding to these adjustable sections 208b, 133b, and 134b are the fixed sections 208a, 133a, and 134a, the sections 133a and 134a corresponding to like numbered sections shown in Figure 1. It is intended that the sections 208b, 133b, and 134b shall be brought to exact adjustment and sealed at the factory; thus said sections constitute fixed factory adjustments.

The free terminals of the three sections 208a, 133a, and 134a are connected to the fixed contacts 174, 175 and 176, respectively, of the switch element 71a, so that the movable contact 156 of said switch will progressively engage these fixed contacts and thus progressively be connected to the three sections 208, 133 and 134 for the three ratios 1/1, 10/1, and 100/1. It is also noted at this point that the two additional fixed contacts 172 and 171 which may be engaged by this movable contact 156 are connected to the fixed contact 174 by the lead 209. Therefore the 1/1 ratio element 208 is ensured for either of the three switch positions 171, 172, or 174; and the intermediate switch position, corresponding to the fixed contacts 161, 167, 173, 179 and 185 is the "off" position, all of said stationary or fixed contacts being dead.

The free terminal of the current responsive instrument 43 is connected by the lead 210 to the stationary contacts 170, 169, 168, 166 and 165 corresponding to the movable contact 155 of the switch 71a. Thus the instrument 43 is connected to the movable contact 155 (and thus to the lead 190) for any of the five operating positions of the switch 71a.

As a means of adjusting the voltage delivered to the calculating board load without regard to the magnitude of such load which may at the time be present I have now introduced the arrangement which I shall now describe. I have provided the two adjustable rheostats 211 and 212 which are definitely related to each other. A common slide 213 is provided for these two rheostat elements 211 and 212. One end of the rheostat element 211 is connected to the stationary switch contacts 164, 163, 162, 160 and 159 by the lead 214. The opposite end of the rheostat element 212 is connected to the lead 198 by means of the lead 215, a fixed resistance 216 being introduced into this lead 215 as shown. The slide 213 is connected to the lead 193 by a lead 217. With this arrangement it will be seen that the following functions are introduced into the system:

Since the lead 193 connects to the movable contact 158 of the switch 71a it follows that whenever said switch is moved to any of its operating positions (other than "off") this lead is connected to one of the stationary contacts 188, 187, 186, 184 or 183 (the contact 185 being the "off" contact). The slide 213 is therefore brought into contact with these stationary contacts for various switch positions. Now it will be seen that movement of the slide 213 towards the left will increase the amount of the resistance element 211 between the positive terminal of the battery 95 and the lead 193 (and therefore also between the positive battery terminal and the movable contact 158 of the switch 71a). This movable contact is the one which connects to the network element or to the portion under test, so by movement of this slide the amount of the resistance 211 introduced into this portion of the circuit may be adjusted. At the same time since this lead 193 connects to one terminal of the voltmeter 51 it follows that by adjustment of the slide 213 until a desired voltmeter reading is indicated there will be assurance that the element or elements connected to the switch contact 158 is or are at the same potential as the terminal of the voltmeter to which the lead 193 is connected. Thus, if due to increased loading of the network an increased demand for current is produced, thereby increasing the battery load and increasing the internal drop in the battery, the slide 213 may be moved slightly to the right, thus cutting out some of the resistance element 211 contained in the circuit, and correspondingly raising the potential of the end of the network which is in connection with the slide. By this means the effects of internal battery drop may be neutralized, and the potential impressed on the network during test may be maintained constant.

Now it is noted that movement of the slide to the left increases the amount of the resistance element 211 in series with the network elements, but at the same time such leftward movement of the slide decreases the amount of the resistance element 212 contained between the slide and the negative terminal of the battery. It is also noted that between the two terminals of the battery 95 there must be absorbed the full battery voltage through the following local circuit; lead 189, movable switch contact 154, lead 214, that portion of the resistance element 211 lying to the right of the slide 213, that portion of the resistance element 212 lying to the left of the slide 213, lead 215, resistance element 216, and lead 198. Now as an example, the total resistance element 211 may be of the order of 645 ohms, and the total resistance element 212 may be of the order of 10,000 ohms. A given linear displacement of the slide therefore results in change of the amount of resistance of the element 211 in series with the load, but also results in a change in the amount of the resistance 212 in parallel with the load. Furthermore, in case of extreme movements of the slide towards the left, with corresponding large reduction in the amount of the resistance element 212 in parallel with the load, the resistance element 216 will always be present to prevent any excessive flow of current. Thus adequate current flow through the element 211 is obtained at all times to assure sufficient drop thereacross to obtain a desired delivered voltage, no matter how small the network current may be.

The tip contact 68 of the jack 65 connects to the movable contact 156 of the switch 71a; the ring contact 67 of said jack 65 connects by a lead 217a to the stationary contacts 180, 181 and 182 of the switch 71a; and the sleeve contact 66 of said jack 65 connects by a lead 218 to the stationary contact 183 of the switch 71a, and also to one end of the calibrating resistance element 46 which resistance corresponds to the resistance element of like numbering in said earlier patent. The other end of said resistance element 46 connects to the stationary contact 184 of the switch 71a. Accordingly, when the movable switch member is moved to its lowermost position the contact 158 (and therefore the lead 193) is connected directly to the sleeve contact 66, whereas when the movable switch member is moved to its next higher position the resistance element 46 is introduced into this circuit. Since the voltage corresponding to 1.0 per unit volt is now factory pre-set in quantity, the resistance of the element 46 may now also be factory pre-set and sealed, reducing the number of adjustments required of the operator.

I have mentioned the provision of a special jack in the present embodiment of the features of the present invention in newly to be built calculating boards, such jack being designated as "Total I." This jack is shown in Figure 5 at 219. It has the tip contact 220 which connects to the lead 221; and it has the ring contact 222 which normally connects to the tip contact 220 by means of the spring contact 223; and this ring contact 222 connects by the lead 224 to the stationary contacts 177 and 178 of the switch 71a. A lead 225 connects the lead 224 to the lead 196 already referred to.

It will also be seen that with this embodiment of the features of the present invention incorporated into newly to be built calculating boards, when the plug of the cord is inserted into the jack 219 and the switch is moved to its second position (first below the "off" position) the Z plus .1 position is dead due to the fact that the sleeve contact of the jack 219 is open and this is also true of the arrangement when the switch is moved to its first position (second below the "off" position). However, with the plug inserted into this jack 219 the total current may be read on the basis of either of three ratios, by then moving the switch to either of its fourth, fifth or sixth positions (first, second and third above the "off" position), as will be apparent from study of the circuits of Figure 5.

I have already referred to the reversing switch 108 of said earlier patent, and to the fact that in the presently being described embodiment this switch has been set to a location in the circuits different from its original location in the circuits so that it may be used for directly reversing the bus-bars 37 and 38 of the network element. The central leaves 109 and 110 of this reversing switch are connected directly to the bus-bars by the leads 226 and 227 respectively. The two outside contacts 111 and 114 of this reversing switch are connected together by the lead 228, and this lead 228 is itself connected by the lead 229 to the three stationary contacts 186, 187 and 188 of the switch 71a. The two inside contacts 112 and 113 of this reversing switch 108 are connected together by the lead 230, and this lead is itself connected to the lead 221 already referred to.

It is understood that the jack 65 or the jack 219 is intended to receive one of the end plugs 69 of the cord 29 shown in the calculating board arrangement of that earlier patent, No. 2,301,470, with the plug of the other end of such cord inserted into that jack 13 corresponding to a selected network element to be adjusted or tested. Upon inserting the end plugs of such cord into the jack 13 of the selected network element and the jack 65, respectively (of the arrangement shown in Figure 5 hereof), it will be found that the circuits shown schematically in Figures 2, 3 and 4 will be simulated, and that by moving the movable switch member upwardly successively to its fourth, fifth and sixth positions (first, second and third above the "off" position), the circuits incorporationg the features of the present invention will successively be reproduced with the resistance elements 208, 133 and 134 successively introduced into the circuits so established. Suitable values of these constants may be selected according to the requirements of the calculating board, and the desires of the designer, but for the case of ratios of 1/1, 10/1, and 100/1, the following values have been found satisfactory:

There being three of the resistance or impedance elements $r$ in connection with the switching means, these elements may be suitably proportioned for the $I_1/i$ ratios of 2.0, 20.0, and 200.0, respectively, according to the principles already explained herein. Then it will be evident that the true current ratios flowing through the current responsive instrument 43 as compared to the current actually flowing through the network element under test will be 2.0, 20.0, and 200.0, respectively. However, the face of the instrument 43 may be marked with scale readings showing true values of current flowing through the network element, or true values of Z of said network element or said scale may be provided with ratio markings which will inform the operator of the basis of the ratios being currently used. The following constants are mentioned as giving the ratios above mentioned for $I_1/i$:

| True ratio | Marked ratio | $r$ | R |
|---|---|---|---|
| 2/1 | 1/1 | 70 | 70 |
| 20/1 | 10/1 | 1,330 | 70 |
| 200/1 | 100/1 | 13,930 | 70 |

Based on a voltage of battery 136, of 4½.

It will now be seen that when the features of the present invention are incorporated into newly to be built calculating boards it is possible to obtain not only these features which have been disclosed in connection with the accessory unit arrangement, but also additional features now explained.

I shall now disclose embodiments of my present invention including provision for operation on alternating current sources and provision for measuring network impedances which include resistance and reactance. I now call attention to the fact that the features of invention disclosed in said earlier patent, No. 2,301,470, are equally applicable to calculating boards for operation by either direct or alternating current sources. It is now noted, however, that alternating current responsive instruments are less sensitive than direct current instruments of equivalent range, and introduce into the circuits of which they comprise portions a substantially greater impedance than is inserted by direct current responsive instruments inserted into such circuits. For this reason it has heretofore been found necessary, in the case of calculating boards intended for operation on alternating current sources, to use one of two methods to avoid serious errors due to such high impedance values of the alternating current instruments themselves. These methods have been as follows:

A. The use of relatively large currents and voltages in the calculating boards. This is equivalent to employing sufficiently large power levels so that the power dissipated in the instrument itself is not a seriously large portion of the total. This practice has demanded the use of elements capable of carrying large currents without over heating and is furthermore inherently costly, both in construction of the calculating board, and its operation.

B. The use of electronic amplifiers between the circuit to be metered and the instruments used in metering it. Such amplifiers must be exceptionally stable in gain over long periods of time, over wide ranges of measured quantities, and over variations in power supply voltage. Also these amplifiers must introduce practically zero phase shift. So they are expensive and require highly skilled periodic inspection and maintenance.

When using the features of the present invention in calculating boards intended for operation on alternating current sources use can be made of commercially standard alternating current instrument movements, zero impedance is introduced into the circuit which includes the network element under test, and it becomes possible for the designer of the calculating board to select current and voltage levels for such calculating board which the designer may find most favorable without subordinating them to considerations imposed by the characteristics of the instrument itself.

Additionally it is desirable that the operator be able to measure the flow of power, both real and reactive, and with due regard to sign, a requirement which may be met by alternating current operated calculating boards embodying the features of the preesnt invention as will presently be seen.

Measurements of impedance including both resistance and reactance, when using alternating current sources, necessarily include provision for indicating amount and direction of phase displacement in various circuits. This condition also makes it necessary to provide structures capable of null or balance adjustment not only as to magnitude, but also as to phase. A source of alternating current voltage must be provided, and this source must be of fixed frequency, and ideally of pure sine wave form, and this source must be adjustable as to both magnitude and phase. Furthermore certain precautions are necessary in the case of alternating current tests to ensure that no phase shift errors are introduced by the structure of the present invention itself. It is also necessary that the operator be able to determine not only the magnitude of currents and voltages, but the phase position of these quantities as well.

Reference may now be had to Figure 6 which shows a typical circuit for making possible the application of the features of the present invention to a calculating board embodying the invention of said earlier patent, No. 2,301,470, together with the features of the present invention when using alternating current sources of current, and when the elements of the network under test incorporate the presence of reactances as well as resistances.

In Figure 6 I have shown a single network element, 231 corresponding to one of the network elements of the showing illustrated in said earlier patent, No. 2,301,470; but the element 231 is provided with two sections 232 and 233, the former of which is substantially purely resistive and the latter of which is substantially purely reactive in character. Each of these elements is adjustable in amount, the movable contacts 234 and 235 making provision for such adjustments in values of resistance and reactance, respectively. These sections 232 and 233 may be placed in series connection by the jack contacts 236 and 237, so that normally the two sections are in series connection between the element terminals 238 and 239. Thus it is possible to adjust the complete network element 231 to any desired condition of resistance and reactance to simulate a real network element of the network being simulated.

The jacks 240 and 241 (having the tip contacts 236 and 237 already mentioned) also have the ring contacts 242 and 243 and the sleeve contacts 244 and 245, respectively. The sleeve contact 244 connects to the terminal 238 and therefore to one end of the resistance section 232; the ring contact 242 of the jack 240 and the sleeve contact 245 of the jack 241 both connect to the reactance section 233; the ring contact 243 of the jack 241 connects to the terminal 239; and the tip contact 237 of the jack 241 also connects to the adjustable contact 235 of the reactance section.

A suitable cord is provided having the three leads 246, 247 and 248 which are connected to the three contacts of the plug 249 which is provided at the free end of this cord. Upon inserting this plug 249 into the jack 240 the lead 247 is placed in connection with the terminal 238, the lead 248 is placed in connection with the reactance section 233, and the lead 249 is placed in connection with the adjustable contact 234 of the resistance section. At the same time the engagement of the tip contact of the plug with the contact 236 serves to open the circuit previously existing directly between the adjustable contact 234 of the resistance section and the reactance section, and serves to insert the leads 248 and 249 into the circuit between these sections. With the plug inserted into the jack 240 it is therefore possible to read or determine the resistance of the resistance section by use of the leads 247 and 249; and it is also possible to measure total current flow through the resistance and reactance sections in series. Upon inserting the plug into the jack 241 the lead 247 is placed in connection with the reactance section 233 and with the movable contact 234 of the resistance section, the lead 248 is placed in connection with the terminal 239, and the lead 249 is placed in connection with the adjustable contact 235 of the reactance section. At the same time the engagement of the tip contact of the plug with the contact 237 serves to open the circuit previously existing between the adjustable contact of the reactance section and the terminal 239, and serves to insert the leads 248 and 249 into the circuit between these elements. With the plug inserted into the jack 241 it is therefore possible to read or determine the reactance of the reactance section by use of the leads 247 and 249; and it is also possible to measure total current flow through the resistance and reactance sections in series. Evidently therefore I have made provision for individual adjustment of the magnitudes of resistance and reactance of the sections comprising this network element (or any other such network element); I have made provision for normally placing these sections in series connections between the terminals of such network element; and I have also made provision whereby each of said sections may be brought into connection with some other instrument by leads of the cord inserted into the jack corresponding to such network element section, thus making it possible to adjust the resistance and reactance sections individually to the desired values of resistance and reactance to simulate the real network element. I shall now show how such adjustments of the resistance and reactance sections may be measured by means incorporating the features of invention already disclosed herein respecting the adjustment of simple resistance elements.

I have described one method which employs the structure disclosed in Figure 6 and by which it is convenient to separately adjust the resistance and the reactance of the respective sections of the network element 231. It will be understood that any one of several circuit arrangements may be used to accomplish such an adjustment, the preference being influenced by design considerations. For example, if the circuit constants selected are such that the resistance inherent in the inductor 233 of Figure 6 is too large to be neglected, the circuit arrangement shown in Figure 9 may be substituted for that portion of Figure 6 which comprises the network element 231. In Figure 9 connections of the inductive reactance section 233 and the jack 326 which is associated therewith are substantially unchanged from those shown in Figure 6, and the adjustment of this reactance section is accomplished by the insertion of the plug 249 into the jack 326 as previously described. The connections of the jack 327 provided for the adjustment of the resistance section have, however, been altered by connection of the sleeve 328 to include in the circuit between the sleeve and tip contacts both the reactance section 233 and the resistance section 232. If a source of direct current is employed in the adjustment of the resistance section, the current will pass through both the resistance and reactance sections in series and a direct current responsive instrument, provided with a suitable scale calibrated in impedance terms, may be caused to indicate the resistance of the complete network element as described in my aforesaid issued patent, No. 2,301,470. Such a direct current will not, except for transients of short duration, be affected by the reactance of the complete network section. If the resistance of the reactive section 233 is negligibly small as it may be when certain design constants are used, the circuit connections of Figure 6 provide adequate accuracy; with other values of design circuit constants the resistance of the reactive section may be sufficient to require the use of the circuit connections shown by Figure 9 to obtain acceptable overall accuracy. Other possible circuit connections differing in detail from either Figure 6 or Figure 9 may be found to afford advantages in specific cases. For example, when a network element is employed to represent a load in a real network, it is convenient to adjust not the resistance and reactance of the element as such, but to adjust the "in phase" and the "quadrature" components of the current flowing through the load. Such adjustment is facilitated if the resistive and reactive sections of the network element are connected normally in parallel instead of in series as shown in Figures 6 and 9. Parallel connection is advantageous in this condition as it permits separate measurement of the resistive and reactive components of the current and independent adjustment of either. Accordingly, I do not wish to be limited to the detail connections shown for a network element except as I may limit myself in the claims to follow.

Each of the sections 232 and 233 could be brought into correct adjustment, the one for value of resistance, and the other for value of reactance, by impressing a 1.0 per unit alternating voltage across these elements, one at a time, and observing the deflection of a suitable current responsive instrument in series circuit therewith, this being facilitated if the instrument is provided with an appropriate scale calibrated in per unit I impedance, and further provided that the impedance of such instrument were sufficiently low in comparison with the impedance of the network element being adjusted. If any impedance be present in such instrument the accuracy of the adjustments will be impaired according to the basic principles already explained herein. In order to reduce the "equivalent" resistance and the "equivalent" reactance of the instrument to zero during adjustments of the two sections of the network element use may be made of means according to the principles already disclosed herein; but it must now be noted that should an alternating current be passed through the scheme as shown diagrammatically in either of Figures 1, 3, 4 or 5, flowing between the leads 143 and 144 of Figures 1, 3 and 4, or between the leads 192 and 201 of Figure 5, the currents momentarily existing in the branches 133 and 139 (or corresponding thereto), and in the elements of such branches, would generally be out of phase. Generally the phases of the currents flowing through these impedance elements would be different, and the amount of such difference would depend on many factors including the further effect of the impedance of the current responsive instrument itself. And since these currents would also differ in magnitude, and since such difference in magnitude would also depend on variations of the adjustments of the impedance section 135b, the effect of such phase differences would be reflected in varying manners on the indication of the null indicator. For these and other reasons it is necessary to make special provisions in the circuits, and to provide a special form of null indicator in place of the simple form of instrument 149 which is usable when direct current sources are provided instead of alternating current sources. I shall now disclose the further provisions which I have made to enable the successful application and use of my present invention in the case of alternating current sources of supply, and operation.

I provide a source of alternating current 250. A preferred form of this source, and one which is well known in the art, comprises a polyphase winding, 251 in a suitable stator frame. This stator element provides a rotating field when supplied with polyphase currents by impression of polyphase voltages to the phase windings of this stator element. The rotor element 252 located within this stator is provided with a single phase winding; and by blocking this rotor element at a proper phase position with respect to the stator element the single phase voltage induced in this rotor winding will bear a specified or desired phase position with respect to the voltages impressed on the stator winding. This rotor may be readily blocked or held stationary at adjusted phase position in simple manner, as by provision of a hand wheel adjustment provided with degree markings by which the angular position of such adjustment may be known, and by provision of suitable means to lock the hand wheel in such adjusted position. Such means are well known.

The so-provided and phase controlled single phase voltage is used to excite the primary 253 of a transformer 254; and the secondary 255 of this transformer may be tapped as shown at 256 so that the switch 257 may be moved to proper position to deliver the desired voltage to the leads 258 and 259. A voltage of controlled magnitude and controlled phase position is thus made available for the calculating board now being described.

There is provided a source of alternating current voltage in synchronism with the source 258—259, and of fixed phase position, with which the source 258—259 may be compared. For this purpose I have illustrated the transformer 260 having its primary 261 connected to one leg of the polyphase source 250 as shown in Figure 6, by the leads 262 and 263, a cutout switch 264 being provided in these leads. The secondary 265 of this transformer may be tapped as shown so that by movement of the switch 266 the potential between the leads 267 and 268 may be adjusted. This potential may be read on the voltmeter 269. This arrangement makes it possible to supply current to the leads 267 and 268 at 1/10 of the unit calculating board voltage, that is, at 0.1 per unit volt.

When using direct current sources of supply it will generally be found sufficient and satisfactory to provide for only three ratios, such as 1/1, 10/1, and 100/1, and for this reason I have illustrated and described such arrangements previously herein. However, when using alternating current sources of supply it will generally be desirable to provide an additional ratio for the following reason:

The usual commercial movements of alternating current instruments are readable only from about 20% of full scale to full scale. It is therefore desirable to provide a greater range of ratios when using alternating current sources than when using direct current sources, and for this reason I have, in the arrangement now to be described made provision for four ratio positions.

In Figure 6 there is shown the switch unit 270. This is provided with the three movable contacts 271, 272 and 273. Corresponding to the movable contact 271 there are the eight stationary contacts 274, 275, 276, 277, 278, 279, 280 and 281; corresponding to the movable contact 272 there are the eight stationary contacts 282, 283, 284, 285, 286, 287, 288 and 289; and corresponding to the movable contact 273 there are the eight stationary contacts 290, 291, 292, 293, 294, 295, 296 and 297. The contacts 286, 287, 288 and 289, and the contacts 290, 291, 292 and 293 are not used electrically, but are shown for uniformity of illustration. Also the contacts 282, 283, 284 and 285 are connected together by the lead 298, and the contacts 294, 295, 296 and 297 are connected together by the lead 299. Also, the contacts 274 and 278 are connected together and to the lead 300; the contacts 275 and 279 are connected together and to the lead 301; the contacts 276 and 280 are connected together and to the lead 302; and the contacts 277 and 281 are connected together and to the lead 303. The central position marked "Off" is the "off" or "dead" position of the switch.

There are provided the four resistance elements, 304, 305, 306 and 307 for the four selected ratios, for example, 1/1, 5/1, 20/1 and 100/1. These resistances are connected, respectively, to the leads 300, 301, 302 and 303, and their other ends are connected to the common lead 308. There is provided the comparison resistance element 309; and one end of this is connected to the lead 298, and its other end is connected by the lead 310 to the lead 308.

There is provided the current responsive instrument 311 suitable for operation on alternating current. One terminal of this instrument is connected by the lead 312 to the junction of the leads 308 and 310, and the other terminal of this instrument is connected to the lead 259, a protective resistance 313 preferably being introduced into this lead as shown. The lead 298 (and one end of the comparison resistance 309) connect to the leads 258 and 268 by the lead 314. The leads 247, 248 and 249 of the cord to which the plug 249 is connected, are connected respectively to the movable contacts 273, 272 and 271. The lead 267 from the transformer 260 connects to the lead 299 for the switch contacts 294, 295, 296 and 297. A null indicator 315 is provided, performing a function similar to the function performed by the null indicator 149 previously described; but in the present case this null indicator 315 is one which is capable of showing phase displacements as well as magnitude differences in the applied potentials. I shall now explain this null indicator 315 in sufficient detail for the present purposes.

The null indicator illustrated consists of a cathode ray oscilloscope of the electrostatic deflection type which is a standard type of commercial electrical equipment well known in the electrical arts. Such an oscilloscope employs a beam of electrons impinging upon a phosphor treated surface of an evacuated glass bulb to produce a visible spot. It also includes two pairs of deflection plates, oppositely disposed within the bulb to control the movement of the visible spot. The application of a positive potential to the plate above the axis of the electron beam results in a movement of the spot upwardly due to the attraction of the negatively charged electrons composing the beam towards the positive charge on the upper plate. The opposite or lower plate may be simultaneously subjected to an equal negative charge by means of one of several well known push-pull circuits, or may be maintained at substantially fixed potential; the exact procedure varying in various commercial forms of the oscillograph. A second pair of deflection plates disposed at 90 degrees to the vertical plates are capable, when subjected to suitable electric charges, of deflecting the spot to the right or the left in a horizontal line. In most commercial forms both the vertical and the horizontal plates are subjected to applied voltages which have been amplified through electronic amplifiers contained within the oscilloscope, and the gain of these amplifiers is usually adjustable by the operator. I have illustrated one form of such an oscilloscope herein as a null indicator to meet the conditions imposed by the use of alternating current sources, but in so doing I wish it understood that I do not intend to limit myself to such a form of null indicator, except as I may do so in the claims to follow.

In the circuit shown in Figure 6 the two vertical plates of the oscilloscope are shown at 316 and 317, and the two horizontal plates are shown at 318 and 319. In the scheme shown in Figure 6 the vertical deflection plate 317 and the horizontal deflection plate 318 are connected together by the lead 320, so these two plates are maintained at equal potential. Other methods of connection would be employed when the oscilloscope incorporated push-pull circuits to the deflection plates. In Figure 6 I have shown the amplifiers 321 and 322 for the vertical and horizontal plates, such showing being by block diagram only since any one of several forms of amplifiers suitable to the present use are commercially available.

The leads 249 and 271 are connected to the lead 320 (and therefore to the plates 317 and 318) by the lead 323; the plate 321 is connected to the lead 314 by the lead 324; and the plate 322 is connected to the junction point of the leads 308, 310 and 312 by the lead 325. With this arrangement it will be seen that whenever the movable contacts of the switch 270 are moved down to an operating position the vertical deflection plates 316 and 317 are connected across the two resistors 309 and 304 (or 305, 306 or 307) in series while the horizontal deflection plates 318 and 319 are connected across the resistor 304 (or 305, 306 or 307) alone. With this arrangement the following functions will occur:

So long as the impedance of the resistance element or the reactance element under test is less than infinity a current will flow through the resistance element 304 (or 305, 306 or 307) and there will be a voltage drop across this element. With an amplifier of suitable gain in the horizontal deflection plate circuit a sufficient potential will be applied to the horizontal plates to obtain a movement of the spot horizontally across the screen. Then if the voltage drops across the resistance 304 (or 305, 306 or 307) and 309 are exactly equal and opposite, there will be no potential impressed on the vertical plates, and no vertical movement of the spot will occur. This is the condition of exact balance desired, and this condition of exact balance will be indicated to the operator by the production of a horizontal line on the screen. This condition also presupposes that the two voltages are exactly in phase. Now if the two voltages are exactly in phase but differ in magnitude the pattern will remain a straight line, but it will be tilted from the horizontal, and the manner of tilt, whether up towards the right, or down towards the right, will indicate whether the drop across the element 309 is too great or too small in value, it being understood that the drop across this element is adjustable in amount similar to the adjustment of the element 135 shown in Figures 3, 4 and 5. If the voltages are equal in magnitude but differ in phase, such phase difference will be indicated by the fact that the straight line will assume an open form, comprising an ellipse, and the length of the vertical chord of such ellipse being an indication of the amount of such phase inequality or difference. If differences exist in both phase and magnitude, the ellipcity will continue and the ellipse will itself be tilted either up or down towards the right, the major axis being thus tilted. It is thus evident that this form of null indicator indicates to the operator all conditions which may require correction, namely, differences in magnitude, or in phase, and the operator may then proceed to make such corrections as may be required.

It is to be noted that the amplifiers serve to ensure sufficient magnitude of potentials across the plates of the null indicator to ensure an indication on the screen of the oscilloscope, and the amount of gain of such amplifiers should be sufficient to ensure a sufficient amount of such deflection to enable easy examination of the indicator during various adjustments of the resistance and reactance elements of the network. Any harmonics present in the alternating current sources, or introduced by non-linearity of the circuit elements, will be amplified by such amplifiers 321 and/or 322, so that the line produced on the screen of the oscilloscope will indicate such harmonics, by departure of the line from a straight condition. However, it is found that with some practice the operator is readily able to interpret the pattern on the screen accurately even when there are present harmonics of relatively high values. It is also noted that the exact amount of gain of the amplifiers 321 and 322 is immaterial, as long as the pattern produced on the screen is of sufficient magnitude to enable the operator to readily interpret the pattern. This fact is of importance in the present device since the gain of ordinary commercial amplifiers may be expected to vary with aging of their tubes, with variation in power supply voltage, and other factors.

The preferred method of adjustment of a typical resistance or reactance element (232 or 233) to the desired value, will consist in first adjusting the phase position of the source 254 to zero degrees (in the case of a resistance element) or to 90 degrees (in the case of a reactance element), and then adjusting the magnitude of the voltage by use of the switch 257 to obtain on the current responsive instrument 311 a deflection corresponding to the value of the resistance (or reactance) desired. This will generally produce a tilted pattern on the screen of the null indicator. The resistance (or reactance) element is then adjusted to produce the desired horizontal linear pattern on the screen of the null indicator.

It will be evident that in practice the current in the resistance 304 (or 305, 306 or 307) may not be actually in phase with the voltage source 260 when adjusting a resistance element, nor in exact quadrature when adjusting a reactance element. Such departure from exact phase for the adjustment of a resistance element will be due to reactance unavoidably included in the circuit, and such departure from exact quadrature for the adjustment of a reactance element will be due to the unavoidable inclusion of resistance in the circuit. These effects can be minimized by proper selection of circuit constants. Any error remaining after reduction of these discrepancies by proper selection of circuit constants will not result in a false indication of the setting of the resistance (or reactance) being adjusted. This is because, once a null indication has been obtained the magnitude of the drop across the resistance 309 must be equal and opposite to that across the resistor 304 (or 305, 306 or 307). If both are pure resistances, the currents in them must be in exact opposition. These two currents will therefore be additive algebraically rather than geometrically, which is the preferred condition for an accurate indication of the setting of the element under adjustment by use of the instrument 311. If residual reactance is present when adjusting the resistance element, it is only necessary to adjust the phase position of the source 254 "off zero" by the proper amount to obtain a balance and no error is introduced. Likewise, if, when adjusting a reactance element there be present residual resistance, it is necessary to adjust the phase of the source 254 "off quadrature" by the proper amount. Such adjustments are readily made, and they do not impair the accuracy of the setting of the resistance or reactance element then being made. Frequently such adjustments are not needed at all since the unwanted components of reactance or resistance, as the case may be, are of negligible values, and do not affect the pattern produced on the screen of the null indicator appreciably.

In the foregoing I have spoken of the adjustment of the resistance or reactance section of a network element by impressing across the appropriate section a 1.0 per unit voltage and observing the deflection of a suitable current responsive instrument in series therewith. It will be appreciated that in adjusting a section of a network element to a low value of resistance or reactance, the use of a 1.0 per unit voltage will result in a large per unit current which may become excessive as the desired adjustment becomes smaller, with consequent damage to the equipment. Accordingly, it may be desirable to employ a voltage smaller than 1.0 per unit in any convenient ratio, as 0.1 per unit voltage. It will be understood that any predetermined value of voltage may be used in accomplishing the adjustment provided only that the scale of the current responsive instrument is appropriately calibrated for the voltage selected.

The arrangements shown in the circuit of Figure 6 may be used not only for making the adjustments of the various resistance and reactance sections of the elements of the network to values which are correct for representation of the values of corresponding elements of a real network, but may also be used for reading currents in various branches of the so-adjusted network and its branches, and for measurement of voltages at any point of the network so set up. These uses will now be briefly explained.

In Figure 8 I have shown in simplified form the elements used in measuring current in a selected branch of the miniature network, it being understood that currents in other branches may be measured by similar means and operations. Upon inserting the plug 249 into the jack 240 or 241 a circuit is established through the tip and ring contacts of such jack, through the resistance element 304 (or 305, 306 or 307) to the junction with the resistance 309. Source 254 will produce a current through resistance element 309 to this same junction. The sum of these two currents will pass through the current responsive instrument 311 and source 254 to the right hand end of resistance element 309, where these two currents will separate, each returning to its source. The null indicator will indicate the necessary adjustments needed in phase position and magnitude of the voltage source 254, so that the operator may establish the desired balance by making such adjustments. The null condition having been established the current responsive instrument 311 will show the current flowing in the branch under examination multiplied by a fixed constant, depending upon the position of the switch 270 (which switch has not been shown in Figure 8 for purposes of simplification of that figure, only). By providing an appropriate scale on the instrument 311 this current may be read directly on such instrument. The phase position of the current then being measured in such branch may be read directly from the phase position of the voltage from the source 254 necessary to obtain the null condition. Such phase position will be shown by the markings on the adjustment wheel used in the setting of the voltage source 250. The operator is thus able, by a single null adjustment, to read both magnitude and phase position of the current in any branch of the network by merely inserting the plug 249 into the jack of the network element, and then making the adjustments and readings just explained.

It is also to be noted that in place of the instrument 311 there may be substituted the current coil of an indicating wattmeter without in any manner altering the validity of the foregoing explanation. The current in the wattmeter coil will then be in phase with that in the branch being tested, and related to it in magnitude by some predetermined constant multiplier.

I have previously herein mentioned by way of illustration a set of the values for $r$ and $R$ which are satisfactory for giving certain values of $I_1/i$ in calculating boards intended for operation on direct current sources. I now mention a set of values for the resistance elements 304, 305, 306 and 307, and for the element 309, which I have found satisfactory for use in calculating boards intended for operation on alternating current sources as follows:

| Switch Position | $r$ | $R$ | Readable range of 311 |
| --- | --- | --- | --- |
| 1 up, marked "I×1" | 100 | 100 | 2 per unit I to 10 per unit I. |
| 2 up, marked "I×5" | 900 | 100 | .4 per unit I to 2.0 per unit I. |
| 3 up, marked "I×20" | 3,900 | 100 | .1 per unit I to .5 per unit I. |
| 4 up, marked "I×100" | 19,900 | 100 | .02 per unit I to .1 per unit I. |
| 1 down, marked "Z×1" | 100 | 100 | .05 per unit Z to .01 per unit Z. |
| 2 down, marked "Z×.2" | 900 | 100 | .25 per unit Z to .05 per unit Z. |
| 3 down, marked "Z×.05" | 3,900 | 100 | 1.0 per unit Z to .20 per unit Z. |
| 4 down, marked "Z×.01" | 19,900 | 100 | 5.00 per unit Z to 1.0 per unit Z. |

Base voltage, 1.0 per unit, 100 volts.
Base current, 1.0 per unit, 10 milliamperes=0.010 ampere.
Base impedance, 1 per unit, 100 volts/0.10 ampere=10,000 ohms.

The foregoing values for the resistance elements 304, 305, 306, 307 and 309 are given merely by way of illustration; but the following comments are in order regarding this combination of these elements as herein used, namely:

1. The range of current measurements available with a single milliammeter carrying four per unit I scales is from 0.02 to 10.00 over unit I with full recognition of the fact that usual commercial movements of the moving iron type are readable only from 20% of full scale to full scale.

2. The range of impedance measurements with the milliammeter mentioned in (1) above is from 5.0 per unit Z to 0.01 per unit Z using four scales.

3. Both item (1) and item (2) cover a range of 500/1. Many calculating boards currently in operation are not capable of direct readings over so great a range.

4. The voltage drop across the resistances 304 (or 305, 306 or 307) and 309 taken one at a time are in all cases between 2 volts and 20 volts. These values are well adapted for use with the available commercial forms of cathode ray oscilloscopes as null indicators. They are not sufficiently high to damage the equipment under the worst conditions of possible unbalance. They are high enough to make possible an accurate null adjustment using standard commercial amplifiers in conjunction with the oscilloscope.

5. The power dissipation of the resistances 304 (or 305, 306 or 307) and 309 are at all times sufficiently low to permit the use of commercially available rheostats without damage or introduction of significant error due to changes in resistance resulting from temperature rise.

6. The power dissipation in the impedances elements of the calculating board when being adjusted to a selected value by use of the present invention is not in excess of 1 watt. This further permits the use of elements of low power rating with corresponding savings in space and cost.

It is important to note that, although the resistances 304 (or 305, 306 or 307) and 309 have been regarded as pure resistances in the preceding description, still it is possible to employ impedances in their place so long as the impedance angles are known to the designer and proper allowance is made therefor in the design. If, for example, the element 304 (or 305, 306 or 307) is selected as a pure resistance but 309 is a pure reactance, the drop across the two in series can only be adjusted to a null condition when the current in 309 is ninety degrees out of phase from that in 304 (or 305, 306 or 307). These two currents will then add geometrically instead of algebraically, but their effective sum will continue to bear a fixed and predictable relation to the current in 304 (or 305, 306 or 307) alone. The designer may deliberately employ this form of circuit and modify the calibration of the milliammeter or instrument 311 so that it continues to be direct reading in terms of the current to be measured. No uncompensated error is introduced so long as the proper null balance is maintained. Thus, in the example previously stated, if 304 and 309 are each of 100 ohms value but one is purely resistive and the other is purely reactive, the ratio of current in the instrument 311 to the current to be measured is 1.414/1 instead of 2/1, as would have been the case had both these elements been resistive or both reactive. In fact, the work of the designer is materially simplified and reduced if both of these elements are made purely resistive, and such form of design is preferred, but it will be understood that I do not intend to limit myself to purely resistive (or substantially purely resistive) elements, except as I may do so in the claims to follow.

I claim:

1. In a calculating board for the solution of networks by simulation, means for the measurement of selected simulating network currents including a known resistance arranged to carry the current to be measured, a second known resistance connected in series relation with the first mentioned resistance and arranged to carry a locally generated current, terminal connections to the ends of said first mentioned and said second mentioned resistances, respectively, remote from the point of series connection therebetween, a local current source, means for adjusting the current in said second resistance to produce zero voltage drop across the first mentioned and second mentioned resistances in series when said simulating network current is flowing between said terminals, means for indicating said zero voltage drop condition, and current responsive indicating means responsive to the sum of currents in said first mentioned and said second mentioned resistances, whereby the current producing an indication on said indicating means is related to the said simulating network current by a predetermined multiplying factor which factor is a definite function of the relative magnitudes of said first and said second known resistances when said zero voltage drop condition is indicated by said zero voltage drop indicating means.

2. In a calculating board having a plurality of circuit units and means for interconnecting said units in the simulating configuration of a real network, means for adjustment of the impedance of each of said circuit units, said adjustment means including a known resistance arranged to carry current flowing in said circuit unit as a consequence of the application across said circuit unit of a voltage of predetermined magnitude, a second known resistance connected in series relation with the first mentioned resistance and arranged to carry a locally generated current, terminal connections to the ends of said first mentioned and said second mentioned resistances, respectively remote from the point of series connection therebetween, a local current source, means for adjusting the current in said second resistance to produce zero voltage drop across the first mentioned and second mentioned resistances in series when said first mentioned current is flowing between said terminals, means for indicating said zero voltage drop condition, and current responsive indicating means responsive to the sum of currents in said first mentioned and said second mentioned resistances, whereby the current producing an indication on said indicating means is related to the said first mentioned current by a predetermined multiplying factor which factor is a definite function of the relative magnitudes of said first and said second known resistances when said zero voltage drop condition is indicated by said zero voltage drop indicating means.

3. In a calculating board for the solution of networks by simulation, means for the measurement of a current, said means including a known resistance arranged to carry a current to be measured, a second known resistance connected in series relation with said first mentioned resistance and arranged to carry a locally generated current, terminal connections to the ends of said first mentioned and said second mentioned resistances, respectively remote from the point of series connection therebetween, a local current source, means for adjusting the current in said second resistance to produce zero voltage drop across the first mentioned and second mentioned resistances in series when said current to be measured is flowing between said terminals, means for indicating said zero voltage drop condition, and current responsive indicating means responsive to the sum of currents in said first mentioned and said second mentioned resistances, whereby the current producing an indication on said indicating means is related to the said current to be measured by a predetermined multiplying factor which factor is a definite function of the relative magnitudes of said first and said second known resistances when said zero voltage drop condition is indicated by said zero voltage drop indicating means.

4. In a calculating board for the solution of networks by simulation, means for the measurement of selected simulating network currents including a known impedance arranged to carry the current to be measured, a second known impedance connected in series relation with the first mentioned impedance and arranged to carry a locally generated current, terminal connections to the ends of said first mentioned and said second mentioned impedances, respectively remote from the point of series connection therebetween, a local current source, means for adjusting the current in said second impedance to produce zero voltage drop across the first mentioned and second mentioned impedances in series when said simulating network current is flowing between said terminals, means for indicating said zero voltage drop condition, and current responsive indicating means responsive to the sum of currents in said first mentioned and said second mentioned impedances, whereby the current producing an indication on said indicating means is related to the said simulating network current by a predetermined multiplying factor which factor is a definite function of the relative magnitudes of said first and said second known impedances when said zero voltage drop condition is indicated by said zero voltage drop indicating means.

5. In a calculating board having a plurality of circuit units and means for interconnecting said units in the simulating configuration of a real network, means for adjustment of the impedance of each of said circuit units, said adjustment means including a known impedance arranged to carry current flowing in said circuit unit as a consequence of the application across said circuit unit of a voltage of predetermined magnitude, a second known impedance connected in series relation with the first mentioned impedance and arranged to carry a locally generated current, terminal connections to the ends of said first mentioned and said second mentioned impedances, respectively remote from the point of series connection therebetween, a local current source, means for adjusting the current in said second impedance to produce zero voltage drop across the first mentioned and second mentioned impedances in series when said first mentioned current is flowing between said terminals, means for indicating said zero voltage drop condition, and current responsive indicating means responsive to the sum of currents in said first mentioned and said second mentioned impedances, whereby the current producing an indication on said indicating means is related to the said first mentioned current by a predetermined multiplying factor which factor is a definite function of the relative magnitudes of said first and said second known impedances when said zero voltage drop condition is indicated by said zero voltage drop indicating means.

6. In a calculating board for the solution of networks by simulation, means for the measurement of selected simulating network currents of fixed frequency including a known resistance arranged to carry the current to be measured, a second known resistance connected in series relation with the first mentioned resistance and arranged to carry a locally generated current, terminal connections to the ends of said first mentioned and said second mentioned resistances, respectively remote from the point of series connection therebetween, a local current source of said fixed frequency, means for adjusting the magnitude and phase position of current in said second resistance to produce zero voltage drop across the first mentioned and second mentioned resistances in series when said simulating network current is flowing between said terminals, means for indicating said zero voltage drop condition, and current responsive indicating means responsive to the sum of currents in said first mentioned and said second mentioned resistances, whereby the current producing an indication on said indicating means is related to the said simulating network current by a predetermined multiplying factor which factor is a definite function of the relative magnitudes of said first and said second known resistances when said zero voltage drop condition is indicated by said zero voltage drop indicating means.

7. Means as specified in claim 6 wherein said zero voltage drop indicating means comprises means to indicate difference in magnitude of potential difference between each of said terminals and another point, and also to indicate difference in phase position between the potentials between said terminals and said other point.

8. In a calculating board having a plurality of circuit units each including a resistance section and a reactance section, means for the adjustment of the impedance of one of said sections, said adjustment means including a known impedance arranged to carry current flowing in said section as a consequence of the application across said section of a voltage of predetermined magnitude and frequency, a second known impedance connected in series relation with the first mentioned impedance and arranged to carry a locally generated current, terminal connections to the ends of said first mentioned and second mentioned impedances, respectively, remote from the point of series connection therebetween, a local current source of said predetermined frequency, means for adjusting the magnitude and phase position of the current in said second impedance to produce zero voltage drop across said first mentioned and second mentioned impedances in series when said first mentioned current is flowing between said terminals, means to indicate said zero voltage drop condition, and current responsive indicating means responsive to the sum of the currents in said first mentioned and said second mentioned impedances.

JAMES H. STARR.

REFERENCES CITED

The following references are of record in the file of this patent:

UNITED STATES PATENTS

| Number | Name | Date |
|---|---|---|
| 1,287,970 | Greinacher et al. | Dec. 17, 1918 |
| 1,588,539 | Fortescue | June 15, 1926 |
| 1,954,311 | Fausett | Apr. 10, 1934 |
| 2,123,142 | McMaster | July 5, 1938 |
| 2,140,662 | Zuschlag | Dec. 20, 1938 |
| 2,288,310 | Zuschlag | June 30, 1942 |
| 2,301,470 | Starr | Nov. 10, 1942 |
| 2,318,248 | Minton | May 4, 1943 |
| 2,323,588 | Enns | July 6, 1943 |
| 2,371,636 | McConnell | Mar. 20, 1945 |
| 2,417,820 | Ginzton | Mar. 25, 1947 |
| 2,471,105 | Gustafsson | May 24, 1949 |
| 2,475,827 | Evjen | July 12, 1949 |